US008132948B2

(12) United States Patent
Owen et al.

(10) Patent No.: US 8,132,948 B2
(45) Date of Patent: Mar. 13, 2012

(54) METHOD AND APPARATUS FOR DIRECTING LIGHT AROUND AN OBSTACLE USING AN OPTICAL WAVEGUIDE FOR UNIFORM LIGHTING OF A CYLINDRICAL CAVITY

(75) Inventors: Edward C. Owen, Redmond, WA (US); John Ikeda, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 12/253,320

(22) Filed: Oct. 17, 2008

(65) Prior Publication Data
US 2010/0097820 A1 Apr. 22, 2010

(51) Int. Cl.
*F21V 7/04* (2006.01)
(52) U.S. Cl. ........ 362/555; 362/109; 362/551; 362/558; 385/14
(58) Field of Classification Search .................. 362/109, 362/551, 555, 558, 26, 33; 385/14
See application file for complete search history.

(56) References Cited

U.S. PATENT DOCUMENTS

| 4,257,084 A * | 3/1981 | Reynolds | 362/601 |
| 6,236,785 B1 * | 5/2001 | Parker et al. | 385/48 |
| 6,552,658 B1 * | 4/2003 | Roller et al. | 340/475 |
| 7,527,437 B2 * | 5/2009 | Santos et al. | 385/93 |
| 2006/0062127 A1 * | 3/2006 | Burghardt et al. | 369/121 |
| 2008/0150915 A1 * | 6/2008 | Shibue et al. | 345/176 |
| 2010/0142223 A1 * | 6/2010 | Suckling et al. | 362/615 |

FOREIGN PATENT DOCUMENTS
EP 2163809 * 3/2010
JP 2001313260 A * 11/2001

OTHER PUBLICATIONS

Ryer, A., Light Measurement Handbook, International Light, http://www.intl-light.com/handbook, Copyright 1998, 64 pages.
Light Guide Techniques Using LED Lamps, Application Brief I-0003, www.agilent.com/semiconductors, Copyright 2001, Agilent Technologies, 22 pages.

* cited by examiner

*Primary Examiner* — Ali Alavi
(74) *Attorney, Agent, or Firm* — Woodcock Washburn LLP

(57) ABSTRACT

A method and apparatus for directing light from a light source along a trajectory to avoid particular obstacles and provide uniform illumination of a surface having a particular geometry such as a cylindrical geometry is described. The surface may enclose components such as PCBs that provide particular functionality that operate as obstacles to a light beam.

20 Claims, 3 Drawing Sheets

METHOD AND APPARATUS FOR DIRECTING LIGHT AROUND AN OBSTACLE USING AN OPTICAL WAVEGUIDE FOR UNIFORM LIGHTING OF A CYLINDRICAL CAVITY

BACKGROUND

Illumination systems are critical for many devices including computer displays, televisions and for entertainment purposes. Devices may utilize lighting for practical purposes to provide communication of various events or for aesthetic or decorative purposes. As many devices utilize complex geometries and may incorporate many functional components serving as obstacles such as electronics in printed circuit boards ("PCBs"), directing light to traverse a particular path while avoiding these obstacles becomes a challenging problem. The directing of light along a particular path in such a device may be complicated by practical design requirements, which may require for example a power source such as a battery pack to be placed inside the device or a switch to be positioned in a particular position. All of these functional components may generate obstacles for the desired transmission of light along a particular trajectory.

It is often desirable to provide uniform lighting of a device or object having a particular geometry such as a cylinder. In industrial design, an object may have a particular function that may require other components that may complicate the uniform lighting of an enclosing geometry such as a cylinder. For example, a device may require electronic components for particular functionality. The electronic components may be enclosed in a case having a particular geometry such as a cylindrical geometry. The electronic components or other hardware required for the functioning of the device may create particular challenges for uniform illumination of the enclosing case due to scattering of the light off of the components.

The use of an optical waveguide for the directing of light along a particular trajectory is well known. Optical waveguides may operate by capitalizing on a phenomenon known as total internal reflection wherein the index of refraction of the material forming the waveguide in relationship to the index refraction of a surrounding medium such as air is arranged to achieve a particular critical angle. Light rays arriving at the critical angle or greater at the surface between the two materials are refracted along the boundary.

Methods for uniform illumination of planar flat panel displays such as transreflective liquid crystal displays ("LCDs") are also known. For example, light emitting diodes ("LEDs") may be used to produce uniform illumination for liquid crystal displays by converting an LED's output flux distribution to a uniform one with plastic, injection-molded light pipes. In particular, an aspheric light pipe may be used as a wavequide.

The use of smooth sides in a wave guide parallel to the direction of propagation of light but utilizing a diffused exit end with random critical angles to allow a high probability that light rays can escape is also known. In addition, light guides may be bent to go around corners. Wedge light guides having either a planar surface or a curved surface may also be used, the former of which may be utilized to backlight transreflective LCD displays is also known.

However, apparatus for bending light around an obstacle are not well known. And, in particular, the bending of light around an obstacle such as a PCB for illumination of a particular surface geometry such as a cylinder is not known. Thus, there is a need for a method and apparatus for directing light around an obstacle such as electronic components, so that the light may provide maximum illumination of a particular surface geometry such as a cylindrical geometry.

SUMMARY

A method and apparatus for directing light from a light source along a trajectory to avoid particular obstacles and provide uniform illumination of a surface having a particular geometry such as a cylindrical geometry is described. The surface may enclose components such as PCBs that provide particular functionality that operate as obstacles to a light beam.

According to one embodiment, a first clear cylindrical surface may be enclosed by a second opaque cylindrical surface. At least one portion of the opaque cylindrical surface may be removed to create respective windows allowing the escaping of light.

According to another embodiment, an optical waveguide may be arranged in an aspherical configuration and directly coupled to a light source such as an LED light source. The optical wave guide may comprise an inner portion comprised of a material having a first index of refraction and a textured outer portion having a second index of refraction. The optical wave guide may comprise polycarbonate material and may be further configured in an aspherical form.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

Figure 1A:
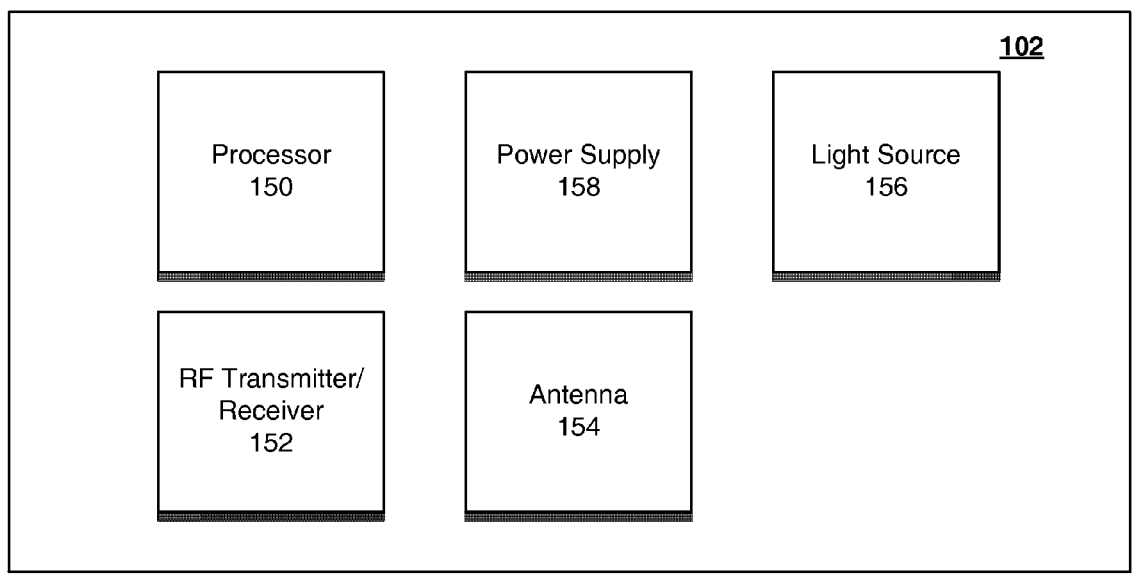
FIG. 1a is a block diagram of a lighted device.
Figure 1A:
Figure 1A:
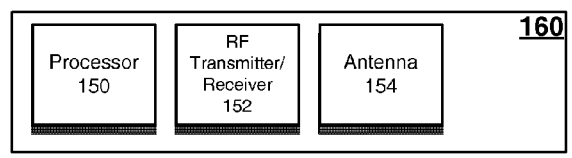

FIG. 1a is a block diagram of an exemplary lighted device. As will become evident below, an exemplary lighted device having the structural aspects depicted in FIG. 1a may comprise a particular geometry that may require the transmission of light around various obstacles or obstructions in order to illuminate a surface or other are of the device.

Device 102 may processor 150, power supply 158, RF transmitter/receiver 152, antenna 154 and light source 156. Power supply 158 may provide power for processor 150, RF transmitter/receiver 152, light source 156 and any other electronic components that may be installed on device not shown in FIG. 1a. Device 102 may transmit information regarding game play with video game console 160 via RF transmitter/receiver 152 and antenna 154. Light source 156 may provide aesthetic as well as communicative lighting of device 102. Light source 156 may be a light emitting diode ("LED") or other light source. In other words, light source 156 may provide lighting of device 102 in order to enhance game play as well as to communicate various messages or information regarding game play for titles running on video game console 160. For example, as discussed herein according to one embodiment device 102 is configured as a wand in a cylindrical shape and it is desired that light source 156 be configured to transmit light to illuminate a cylindrical surface of device 102.

Processor 150 may perform various functions on device 102 for control of the device and may also control the exchange of information with video game console 160. Device 102 may also include a printed circuit board ("PCB"), which may include circuitry for performing various functions such as control of light source 156 based on commands from processor 150. The PCB may also provide other functionality relating to powering the device In particular, received RF signals from an video game console 160 may be received by device 102, the signals processed by the processor 150 on device 102 and the processor may then control the light source of device 102 as a function of the received signals.

As device 102 may require many electronic or structural components such as a PCB, a battery compartment for housing batteries needed to power device 102, light generated by light source 156 may be blocked or otherwise impeded impeding the usefulness and drama provided by the light source 156. Typically the geometry of various functional and structural components such as a PCB or power supply 156 is not easily controllable and thus there may exist significant potential for these components to serve as obstacles for transmission of light via light source 156.

Figure 1B:
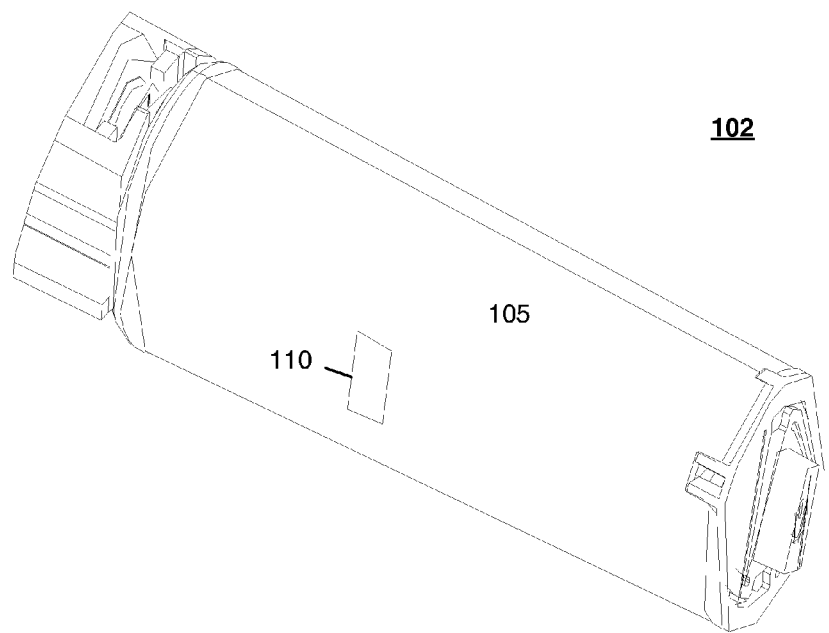
FIGS. 1b and 1c depict a schematic representations of an exemplary devices.

FIG. 1b depicts a schematic representation of an exemplary device. Device 102 may include cylindrical surface 105, which may include one or more windows 110. Each window 110 may allow emission of light either for aesthetic purposes to alert a user of device 102 regarding some event or situation (e.g., relating to game play). Cylindrical surface 105 may comprise a tapered cylindrical sleeve or a uniform cylindrical sleeve. According to one embodiment, it is desirable to provide uniform illumination of cylindrical surface 105 in such a manner to allow light to escape through one or more windows 110. Thus, it is desirable to direct as much light as possible to cylindrical surface 105 to obtain maximum light emitted via windows 110. 110. Although the cylindrical surface 105 includes one or more windows, it should be understood that any type of surface may be utilized and may not include windows.

Figure 1C:
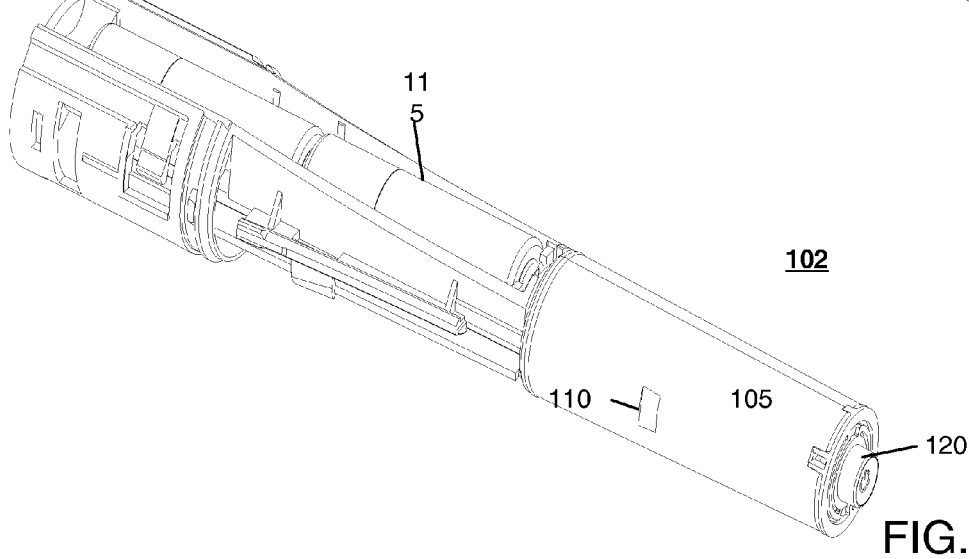

However, as noted previously, device 102 may include functional or structural components such as PCBs that may impede light generated by a light source. For example, FIG. 1c depicts a portion of a device 102 including the portion shown in FIG. 1b but also including battery compartment 115, which houses batteries. The batteries may power a light source such as an LED ("Light Emitting Diode") not shown in FIG. 1b or electronic components, on a PCB for example, that perform some functions on device 102 such as control of the LED or entertainment functions. The device may further include switch 120 to control powering of lighted device 102.

Although a PCB obstruction has been described, it should be understood that the structures and methods described herein may be utilized to provide for the propagation of light around any type of obstacle or obstruction regardless of character, composition or shape and thereby provide uniform illumination of a cavity such as a cylindrical cavity.

Figure 2:
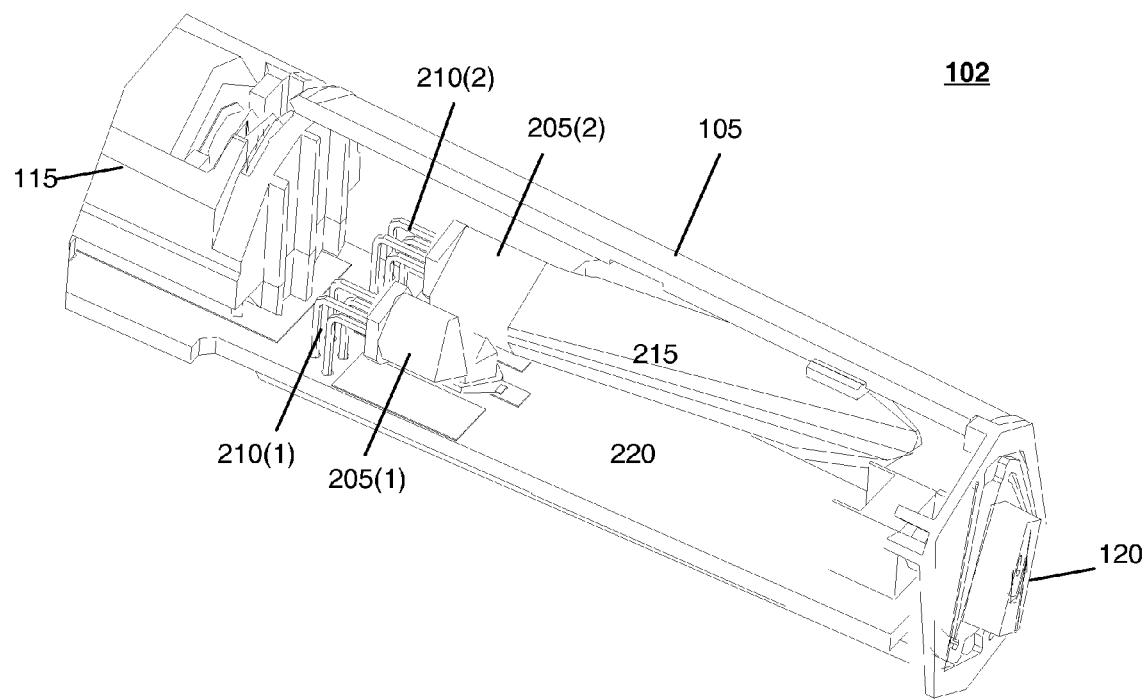
FIG. 2 depicts an interior portion of an exemplary device that includes an optical waveguide for directing light around internal components and to provide uniform illumination of a cylindrical surface housing the device.

FIG. 2 depicts an interior portion of an exemplary device that includes an optical waveguide for directing light around internal components and to provide uniform illumination of a cylindrical surface housing the device. In particular, FIG. 2a shows a portion of device 102 with cylindrical surface 105 removed. FIG. 2a thus shows battery compartment 115, PCB 220, LED 205(1), LED 205(2), LED leads 210(1), LED leads 210(2) and optical waveguide 215.

Battery compartment 115 may house batteries for providing power to device 102 such as LED 205(1), LED 205(2) and PCB 220. Leads 210(1) and 210(2) may provide power respectively to LED 210(1) and LED 210(2) as well as controlling the functions of those LEDs. LED 205(1) may be directly coupled to optical waveguide 215 for directing light for uniform illumination of cylindrical shell Although FIG. 2a only shows a single optical waveguide 215 for receiving light generated by LED 205(1), it is understood that device 102 may include a second optical waveguide 205(2) for receiving light from LEDs 205(2).

According to one embodiment, optical waveguide 215 is configured in an aspherical shape. Further, according to this embodiment, optical waveguide may include a first and second layer comprising an internal and external layer. The internal and external layers may be composed of any materials allowing high transmission materials. For example, according to one embodiment, the internal layer may comprise a smooth layer of polycarbonate. The external layer may also comprise a rough layer of polycarbonate to allow light propagating from the internal layer to escape through the cylindrical surface 105 via windows (e.g., 110 in FIG. 1a). As noted, optical wave guide 215 may be composed of polycarbonate material. However, other materials such as acrylic plastic materials are possible.

According to one embodiment, the optical waveguide may be treated with colorants and/or diffusers. For example, diffusers may be utilized in order to provide more uniform lighting.

A direct input coupling geometry may be used for coupling respective LEDs 205(1) and 205(2) to optical waveguides 215. A direct input coupling geometry couples light directly from a light source such as an LED by placing an emitting surface of the light source (e.g., LED) as close to the input surface of the light pipe as practically possible while avoiding any intermediate steps.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. An apparatus for guiding light to avoid an obstacle in order to uniformly light a cylindrical surface enclosing the obstacle comprising:
    an optical wave guide arranged inside the cylindrical surface, the optical wave guide comprising an inner portion, the inner portion comprised of a material having a first index of refraction and a textured outer portion having a second index of refraction, wherein the optical wave guide comprises polycarbonate material and is configured in an aspherical form.

2. The apparatus of claim 1, wherein the obstacle is a printed circuit board ("PCB").

3. The apparatus of claim 2, wherein the optical wave guide is arranged to receive light from a light source using a direct input coupling geometry.

4. The apparatus of claim 1, wherein the cylindrical surface is opaque.

5. The apparatus of claim 4, wherein the cylindrical surface includes at least one portion that is removed, the removed portion providing a conduit for light to escape from the cylindrical surface.

6. The apparatus of claim 4 further comprising a second cylindrical surface that is clear.

7. The apparatus of claim 6, wherein the second cylindrical surface is arranged inside the cylindrical surface.

8. The apparatus of claim 6, wherein the second cylindrical surface is overmolded.

9. The apparatus of claim 2, wherein the PCB comprises at least an antenna for receiving radio frequency signals.

10. A method for guiding light to avoid an obstacle and uniformly light a cylindrical surface enclosing the obstacle comprising:
arranging an optical wave guide inside the cylindrical surface, wherein the optical wave guide comprises polycarbonate material and an inner portion, the inner portion comprised of a material having a first index of refraction and a textured outer portion having a second index of refraction, wherein the optical wave guide is configured in an aspherical form.

11. The method of claim 10, wherein the obstacle is a printed circuit board ("PCB").

12. The method of claim 11, wherein the optical wave guide is arranged to direct light so that it avoids the PCB.

13. The method of claim 10, wherein the cylindrical surface is opaque.

14. The method of claim 13, wherein the cylindrical surface includes at least one portion that is removed, the removed portion providing a conduit for light to escape from the cylindrical surface.

15. The method of claim 14 further comprising a second cylindrical surface that is clear.

16. The method of claim 15, wherein the second cylindrical surface is arranged inside the cylindrical surface.

17. The method of claim 16, wherein the second cylindrical surface is overmolded.

18. The method of claim 11, wherein the PCB comprises at least an antenna for receiving radio frequency signals.

19. A lighted entertainment device, comprising:
a first cylindrical member, wherein the first cylindrical member comprises a material that transmits light;
a second cylindrical member, wherein the second cylindrical member comprises a material that does not transmit light, wherein the opaque member includes a surface having at least one portion removed to form a respective window;
wherein the second cylindrical member is arranged to be inside the first cylindrical member;
a PCB comprising an antenna for receiving an RF signal;
a first LED ("Light Emitting Diode");
a second LED;
a first optical wave guide comprising polycarbonate material arranged inside the cylindrical surface, the first optical wave guide further comprising an inner portion, the inner portion comprising a material having a first index of refraction, the first optical wave guide further comprising a textured outer portion having a second index of refraction, wherein the optical wave guide is configured in an aspherical form, wherein the first LED light source is arranged so that it directs light into the first optical wave guide using a direct input coupling geometry;
a second optical wave guide arranged inside the cylindrical surface, the second optical wave guide comprising an inner portion, the inner portion comprising a material having a first index of refraction, the second optical wave guide further comprising a textured outer portion having a second index of refraction, wherein the optical wave guide is configured in an aspherical form, wherein the second LED light source is arranged so that it directs light into the second optical wave guide using a direct input coupling geometry;
wherein the first and second optical wave guides are arranged to direct light around the PCB.

20. The lighted entertainment device of claim 19, wherein the lighted entertainment device is utilized in a video game environment as a controller to communicate with a base station via the antenna, wherein signals received from the base station control the first and second LEDs.

* * * * *